United States Patent [19]

Workman

[11] Patent Number: 4,486,797
[45] Date of Patent: Dec. 4, 1984

[54] SLIDING MASK VARIABLE RESOLUTION VELOCITY TRAJECTORY FOR TRACK FOLLOWING SERVO

[75] Inventor: Michael L. Workman, San Jose, Calif.

[73] Assignee: International Business Machines, Armonk, N.Y.

[21] Appl. No.: 443,508

[22] Filed: Nov. 22, 1982

[51] Int. Cl.³ .................. G11B 5/55; G11B 21/08; G05D 13/62

[52] U.S. Cl. .................................. 360/78; 318/561

[58] Field of Search ............... 318/561, 594, 615, 616; 360/78

[56] References Cited

U.S. PATENT DOCUMENTS 3,809,986  5/1974  Visser .................. 318/561
4,096,579  6/1978  Black et al. ............. 364/900
4,272,793  6/1981  Van Landingham ....... 360/78
4,439,800  3/1984  Powell .................. 360/78

Primary Examiner—George G. Stellar
Attorney, Agent, or Firm—Walter J. Madden, Jr.

[57] ABSTRACT

A servo system generates a velocity profile for moving a load from one position to another by dividing the time during which the load is moving into a plurality of segments, each segment being one half as long as the preceding segment. For each segment a fixed number of desired velocity values are stored and used to control the velocity of the moving load. This results in increasing resolution of the velocity wave as the load approaches its desired position, while not requiring excessive storage capacity for storing the desired velocity values.

7 Claims, 11 Drawing Figures

DIODE BREAKPOINT IMPLEMENTATION

MULTIPLIER IMPLEMENTATION

DIGITAL CURVE IMPLEMENTATION

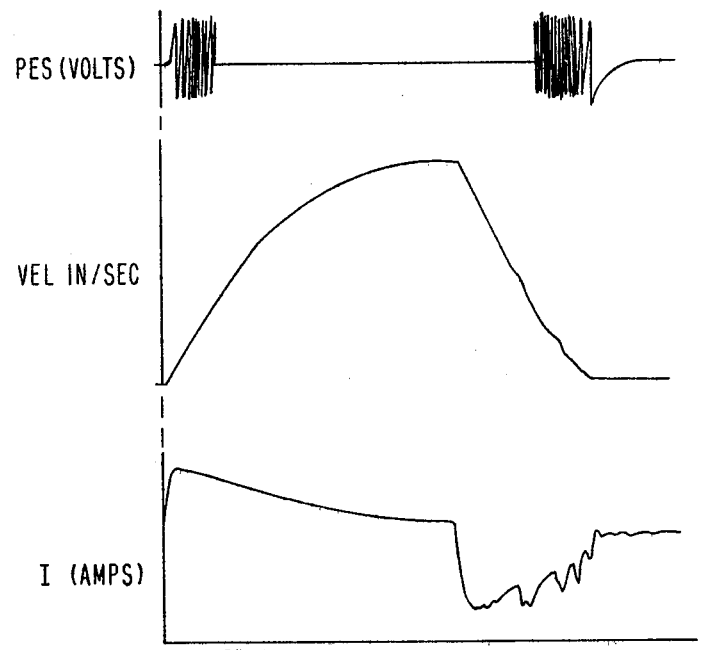
FIG. 8  886 TRACK SEEK
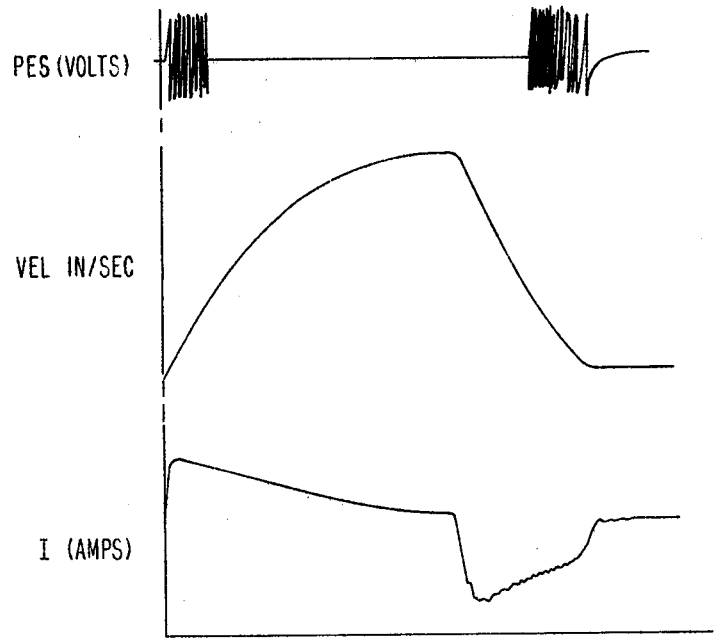
886 TRACK SEEK USING SLIDING MASK $M_\ell-5$
FIG. 9

SLIDING MASK VARIABLE RESOLUTION VELOCITY TRAJECTORY FOR TRACK FOLLOWING SERVO

BACKGROUND OF THE INVENTION

This invention relates to servo systems in which a velocity command is generated which is a measure of the desired velocity of the load controlled by the servo system.

DESCRIPTION OF THE PRIOR ART

Many current magnetic recording disk files imploy servo systems for controlling the movement of one or more magnetic heads to different concentric recording tracks on the magnetic recording disk or disks (track seeking) and for maintaining the head or heads accurately positioned over the center of the selected track or tracks during read or write operations (track following). At the start of a track seeking operation, most of such systems generate a velocity command or curve which is a measure of the desired velocity of the heads in moving from one track to the selected new track location. As would be expeted, this velocity command is a function of the distance to be moved by the head or heads, the desired velocity being higher the longer the distance to be moved. Prior art disk files usually generated different velocity curves or trajectories for different seek lengths using a number of different techniques.

However, velocity trajectory implementation has always presented practical difficulties to the servo designer. Some disk files use a multiplier technique, while others use a diode breakpoint network. Both the multiplier and the diode network have many deficiences. The diode breakpoint causes large disturbances or "bumps" in the current waveform. The multiplier is not very flexible in terms of curve shape, suffers dc drift, and it suffers in the transition to the so-called linear region.

The use of a digital trajectory curve solves virtually all of the above problems associated with the diode breakpoint and multiplier techniques, but it has several problems of its own. The digital curve requires an unreasonable volume of points to be stored in a look-up table to get a reasonable resolution of position vs. velocity.

SUMMARY OF THE INVENTION

The present invention provides a digital servo system employing a sliding mask technique to solve both the storage volume and the resolution deficiencies of the standard digital curve.

BRIEF DESCRIPTION OF THE DRAWINGS

FIG. 8 contains graphs of variations in the current, velocity and PES during a seek operation in a current disk file whose velocity trajectory is shown in FIG. 6; and FIG. 9 shows the improvement in the current graph of FIG. 8 obtained by use of the present invention.

DESCRIPTION OF THE PREFERRED EMBODIMENT

Figure 1A:
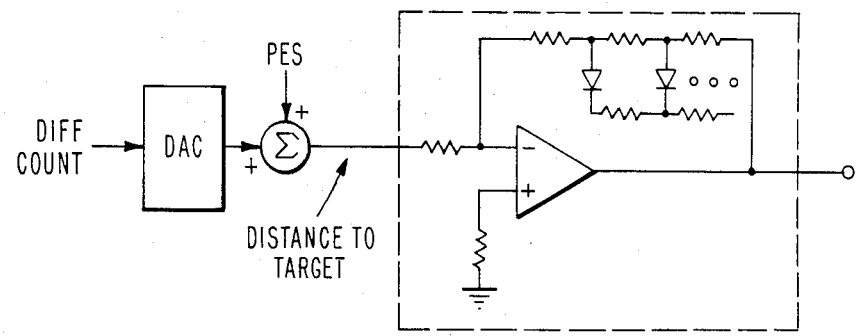
FIGS. 1A, 1B and 1C are diagrams showing different prior art implementations of velocity curve generation.
Figure 1B:
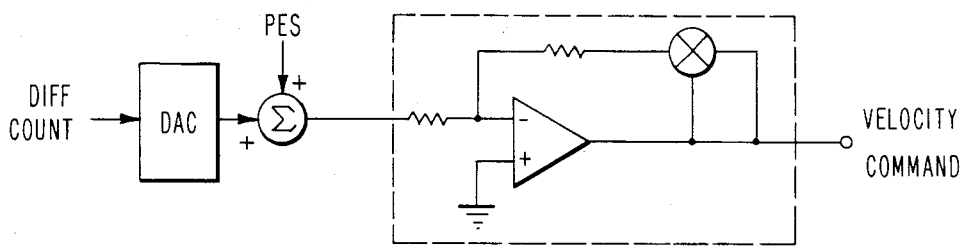
Figure 1C:
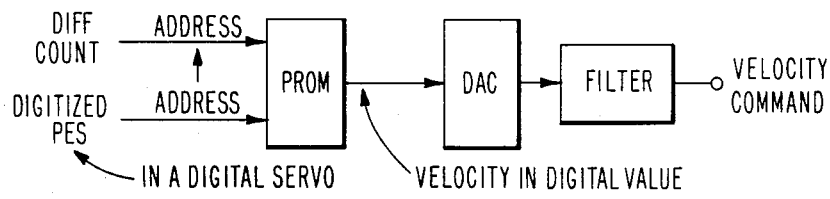

FIGS. 1A, B, C show block diagrams of the aforementioned prior art techniques.

Figure 2:
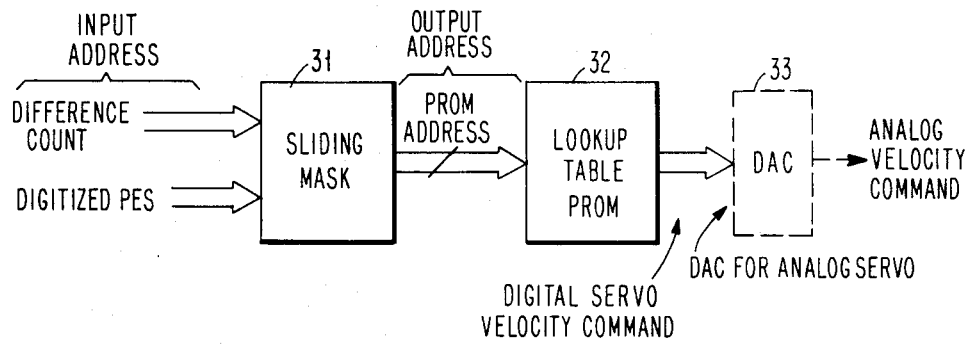
FIG. 2 shows circuitry for implementing the sliding mask technique of the present invention.

FIG. 2 shows how the sliding mask 31 of the present invention is inserted into a digital curve implementation. The key concept of the present sliding mask technique is that high resolution in position is not necessary at large values of velocity command. The resolution must be better and better as the servo approaches the target.

As seen in FIG. 2, one of the inputs to the sliding mask is the difference count, which is a count of the difference between the present track location of the head and the location of the track to which the head is to be moved. This difference count is decremented with each track crossing by the head and reaches zero when the head reaches the selected track, as is well known in the art. The other input to the sliding mask 31 is the digitized position error signal (PES) from the digital servo system. This PES signal is generated from signals produced in the disk file servo read head during track crossings. These inputs are operated on to form an output address which is the input to a look-up table in the form of a programmable read only memory (PROM) 32. The output from PROM 32 is a group of digitized values for the velocity curve. If a digital servo is employed, these digitized values can be utilized directly as the digital velocity command. If an analog servo system is used, the digital values can be converted to analog values in a digital-to-analog converter (DAC) 33.

The sliding mask technique involves dividing the length of the desired velocity curve into a number of segments from the beginning of the curve, each segment being one half the size of the preceding segment. For each segment there is stored an equal number of values for the velocity curve for that segment and these velocity values are used to generate the velocity curve during each segment. This has the effect of reducing the resolution of the curve in the early or high velocity segments of the curve and providing much higher resolution in the critical lower portion of the curve as the head approaches the on track position. This is so because in the lower portions of the curve each segment is much smaller that the early segments, but each segment has the same number of velocity curve values available. This greatly reduces the memory size required to store the velocity values while giving totally acceptable or improved system performance.

Figure 3:
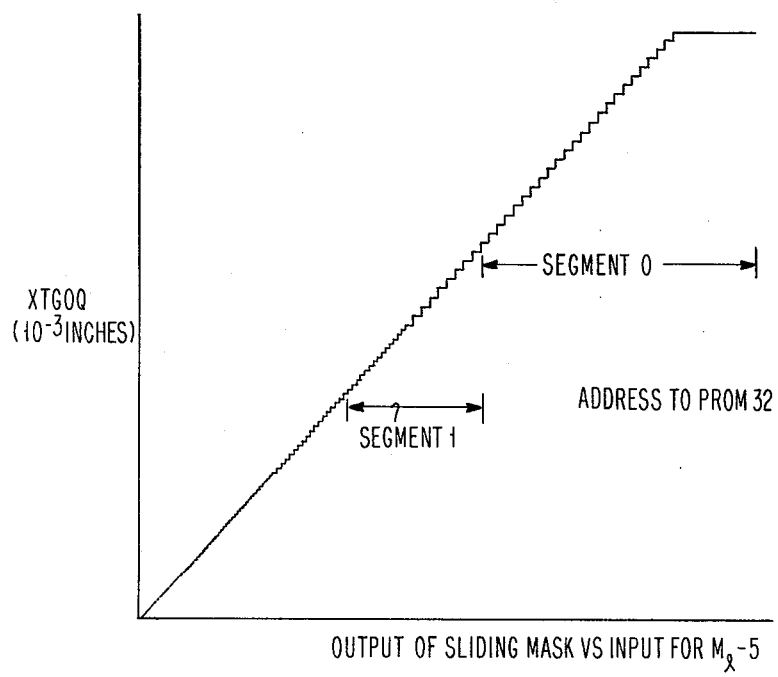
FIG. 3 is a graph of an input/output relationship produced in accordance with the present invention.
Figure 4:
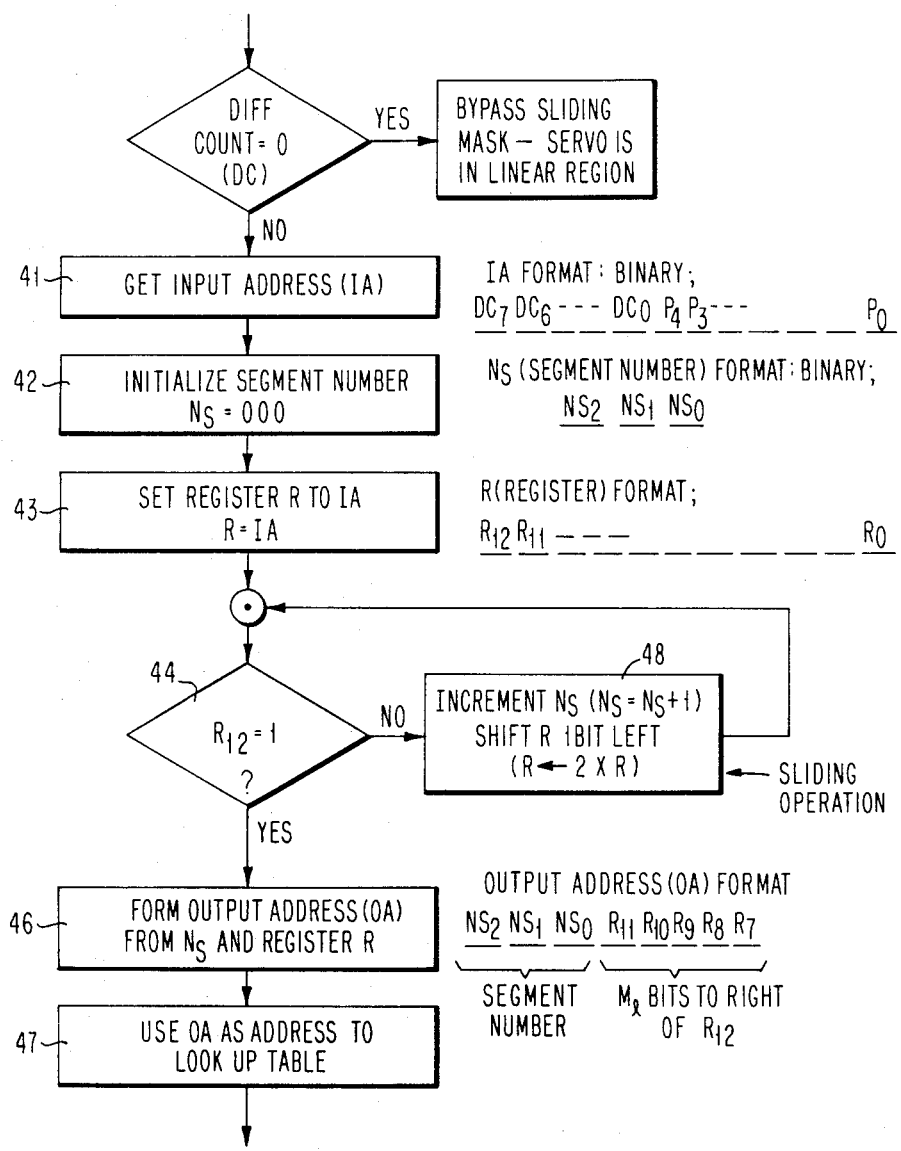
FIG. 4 is a flow chart illustrating the operation of the present invention.

The operation of the present invention can best be understood by reference to the curve of FIG. 3 and the flow chart of FIG. 4. The curve of FIG. 3 shows the generation of the addresses in PROM 32 by which velocity values stored in PROM 32 can be retrieved. As indicated, the curve is divided into segments, the first such segment being segment 0, with each succeeding segment being one half the length of the preceding segment. Referring to FIG. 4, this shows in flow chart form the operation of the present invention for a mask length $M_1$ of 5 bits, the number of difference count bits $DC_n$ equal to 8 bits, and the number of digitized PES bits $P_n$ equal to 5.

If the difference count is zero, the sliding mask technique of this invention is not used, since the servo system is in its linear range. If the difference count is not zero, the input address for sliding mask is formed as represented by block 41. The format of the input address is shown to the right of box 41 and includes the eight difference count bits $DC_0$-$DC_7$ and the five digitized PES bits $P_0$-$P_4$. The next step is to initialize the segment number, as represented by block 42. As indicated to the right of box 42, the segment number is encoded in three bits $NS_0$-$NS_2$, and at the start of a seek, it would be initialized to segment 0, as is apparent from FIG. 3.

Next, the 13 bit register R is loaded with the 13 bit input address, as represented in block 43. The value of the input address in register R is checked to determine if the value of the most significant bit therein, $R_{12}$, is 1. (block 44) If it is (as it would be at the start of a long seek, for example) the output address is formed (block 46) using the segment number $N_s$ and the five bits $R_{11}$-$R_7$ to the right of bit $R_{12}$ in register R. This output address is then used (block 47) to address locations in PROM 32 where the required velocity values are stored. Using a mask $M_1$ of 5 bits permits the addressing of 32 PROM locations to retrieve 32 velocity curve values for each segment. This is shown in FIG. 3 with the 32 staircase values for the sliding mask output in segment 0, and the output velocities 32 staircase values in FIG. 7.

The sliding mask aspect of the invention accurs when $R_{12}$ in register R no longer has a value of 1, indicating that the servo system has moved the head past the inner boundary of segment 0. When this occurs (block 48), the segment number $N_s$ is incremented by one and register R is shifted one bit to the left so that bit $R_{11}$ therein is now the most significant bit in the register. This produces a "yes" output from block 44 so that the output address is now formed from segment number S, and the five bits to the right of bit $R_{11}$ in register R. This permits the addressing of 32 locations in PROM 32 to access 32 values for segment 1 of the velocity curve. Since segment 1 is only half as long as segment 0, it can be seen from FIG. 3 and FIG. 7 that this results in an increase in the resolution of the segment 1 portion of the curve relative to that of segment 0.

Figure 7:
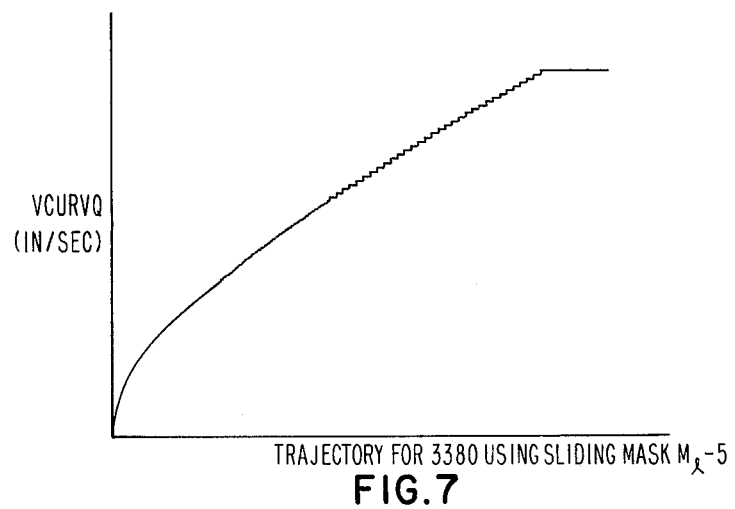
FIG. 7 is a modification of the trajectory curve of FIG. 6 using the sliding mask technique of the present invention.

The above process continues through the eight segments which are encoded in the three segment under bits $NS_0$-$NS_2$, resulting in the retrieval and use of 32 velocity curve values for each segment and producing a velocity curve of increasing resolution as the head approaches the on track position, as is apparent from FIG. 7.

Figure 5:
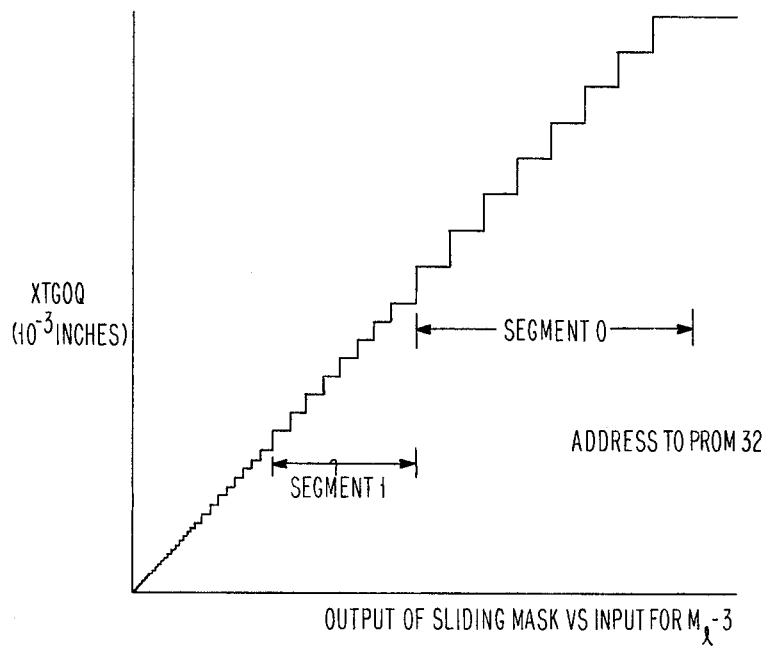
FIG. 5 is a graph of an input/output relationship generated in accordance with the present invention with a lower resolution than the curve of FIG. 3.

The improved resolution obtainable using a mask length $M_1$ of 5 bits as compared to that resulting from a mask length of 3 bits (and hence 8 velocity curve values per segment) is apparent from a comparison of FIGS. 3 and 5.

Thus, the output is formed by sliding a mask $M_1$ bits long to the right as the distance to the target gets smaller. The resolution in position ($R_x$) then varies with position.

$N_s$ = Segment Number
$M_1$ = Mask Length in Bits $$R_x(N_s) = \frac{2(-N_s - 1)X_{max}}{2^{M_1}} \quad (1)$$

$$= 2(-N_s - M_1 - 1)X_{max} \quad (2)$$

where, $x_{max}$ = maximum distance for which curve is defined.

An important point is that in almost any velocity trajectory technique, when the linear region is met (usually X is less that TW/2), the velocity command comes directly from the PES, or input address, and the curve or look up table is bypassed.

The storage size of the look-up table required for the present invention is:

$$N_{sm} = N_{dc} 2^{M_1} \quad (3)$$

where
$N_{sm}$ = PROM storage size required (words)
$N_{dc}$ = number of bits in difference count
$M_1$ = mask length in bits For the standard digital curve technique, the required storage size is:

$$N_{sc} = 2^{N_{dc}} \times 2^{N_{is}} \text{ pes} \quad (4)$$

where
$N_{sc}$ = standard digital curve look up table size
$N_{pes}$ = number of bits in digitized PES.
For a comparison of storage size requirements,
assume $N_{dc}$ = 8, $N_{ps}$ = 5, $M_1$ = 5
For the present technique,
$N_{sm}$ = 256 words
For the standard digital method,
$N_{sc}$ = 8096 words So the sliding mask technique of the present invention requires 32 times less storage for the same resolution at low velocities. (With given assumptions)

Figure 6:
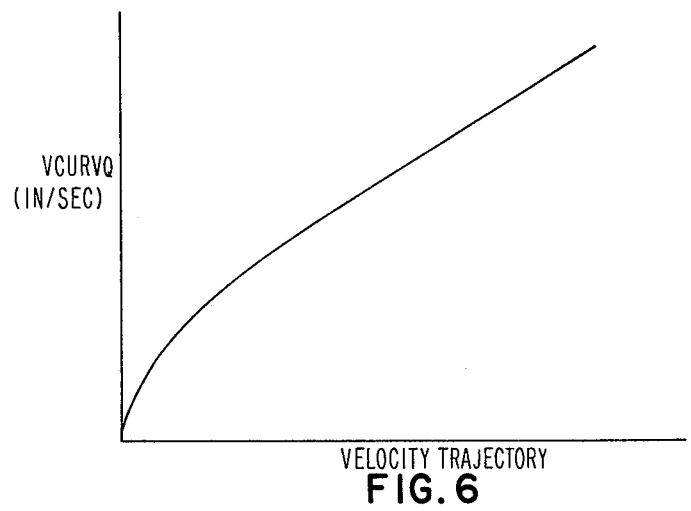
FIG. 6 is a velocity trajectory for a current magnetic disk file.

FIG. 6 shows the diode breakpoint velocity trajectory used in a current disk file. FIG. 7 shows the same curve implemented with the sliding mask technique of this invention. The absence of diode breakpoints can be clearly seen in FIG. 7.

FIG. 8 shows basic seek waveforms for the current disk file whose velocity trajectory is shown in FIG. 6. For exactly the same servo, with a sliding mask digital curve, the same basic seek waveforms appear in FIG. 9. The improved current waveform for the sliding mask can be noted. Also, it has been found that the sliding mask method produces increased speed in total seek time.

I claim:

1. Apparatus for generating a velocity profile for servo system, said velocity profile representing the desired velocity of the load of said servo system in moving from one position to another, comprising
    means for dividing the time during which said servo system is moving said load into a plurality of segments, each of said segments being half the size of the preceding segment,
    means for generating for each of said segments a fixed number of values for the desired velocity of said load, and
    means for utilizing said generated velocity values for controlling the moving of said load.

2. Apparatus in accordance with claim 1 including means for generating a difference count signal which is continuously indicative of the distance remaining to be moved by said load;

means for generating a position error signal; and means for combining said difference count signal and said position error signal to produce an output address.

3. Apparatus in accordance with claim 2 including an addressable memory having stored therein said values for the desired velocity of said laod for each of said segments; and means for supplying said output address to said addressable memory to generate from said memory said fixed number of values of said desired velocity for each of said segments.

4. Apparatus in accordance with claim 3 in which said load is a magnetic disk file actuator arm carrying at least one magnetic transducer; and said position error signal is generated in said transducer as said transducer crosses different concentric tracks on one of the disks in said magnetic disk file.

5. Apparatus in accordance with claim 4 in which said memory is a programmable read only memory.

6. Apparatus in accordance with claim 5 in which said desired velocity values are in digital form.

7. Apparatus in accordance with claim 6 including converter means for converting said desired digital velocity values to analog desired velocity values.

* * * * *

UNITED STATES PATENT AND TRADEMARK OFFICE
CERTIFICATE OF CORRECTION

PATENT NO. : 4,486,797

DATED : December 4, 1984

INVENTOR(S) : Michael L. Workman

It is certified that error appears in the above-identified patent and that said Letters Patent is hereby corrected as shown below:

Column 1, line 14, "imploy" should be --employ--.

Column 4, formula (1), "$R_x(N_s) = \dfrac{2(-N_s-1)X_{max}}{2M_1}$"

should be -- $R_x(N_s) = \dfrac{2^{(-N_s-1)} X_{max}}{2^{M_1}}$ --.

Column 4, formula (2), "$2(-N_s-M_1-1)X_{max}$"

should be -- $2^{(-N_s-M_1-1)} X_{max}$ --.

UNITED STATES PATENT AND TRADEMARK OFFICE
CERTIFICATE OF CORRECTION

PATENT NO. : 4,486,797
DATED : December 4, 1984
INVENTOR(S) : Michael L. Workman It is certified that error appears in the above-identified patent and that said Letters Patent is hereby corrected as shown below:

Column 4, formula (4), "$N_{sc} = 2^{Ndc} \times 2^{N}is\ pes$"

should be -- $N_{sc} = 2^{N_{dc}} \times 2^{N_{pes}}$ --.

Column 4, line 32, "$N_{ps}$" should be --$N_{pes}$--.

Column 4, line 36, "8096" should be --8192--.

IN THE CLAIMS

Column 5, line 9, "laod" should be --load--.

Signed and Sealed this

Second Day of July 1985

[SEAL]

Attest:

DONALD J. QUIGG

Attesting Officer     Acting Commissioner of Patents and Trademarks